(12) United States Patent
Long et al.

(10) Patent No.: US 7,806,046 B2
(45) Date of Patent: Oct. 5, 2010

(54) FOOD PRODUCT TOASTER

(75) Inventors: Robert C. Long, Glenview, IL (US); Michael M. Maciejewski, St. Charles, IL (US)

(73) Assignee: Prince Castle Inc., Carol Stream, IL (US)

( * ) Notice: Subject to any disclaimer, the term of this patent is extended or adjusted under 35 U.S.C. 154(b) by 595 days.

(21) Appl. No.: 11/805,671

(22) Filed: May 24, 2007

(65) Prior Publication Data
US 2008/0289512 A1    Nov. 27, 2008

(51) Int. Cl.
A47J 37/06      (2006.01)
A47J 37/08      (2006.01)

(52) U.S. Cl. .............................................. 99/399; 99/12

(58) Field of Classification Search .................... 99/385, 99/389, 400, 390, 391, 392, 393, 401, 402, 99/399; A47J 37/08
See application file for complete search history.

(56) References Cited

U.S. PATENT DOCUMENTS

| | | | | |
|---|---|---|---|---|
| 3,824,915 A | * | 7/1974 | Capucio | 99/329 RT |
| 4,454,803 A | * | 6/1984 | Wolf et al. | 99/329 RT |
| 4,488,480 A | * | 12/1984 | Miller et al. | 99/386 |
| 5,473,975 A | * | 12/1995 | Bruno et al. | 99/335 |
| 5,522,306 A | * | 6/1996 | DeMars | 99/329 RT |
| 5,746,116 A | * | 5/1998 | Smith | 99/386 |
| 6,157,002 A | * | 12/2000 | Schjerven et al. | 219/388 |
| 6,223,650 B1 | * | 5/2001 | Stuck | 99/386 |
| 6,311,610 B1 | * | 11/2001 | Kettman | 99/386 |
| 7,217,906 B2 | * | 5/2007 | Veltrop et al. | 219/386 |
| 7,297,903 B1 | * | 11/2007 | March et al. | 219/388 |
| 2004/0208961 A1 | * | 10/2004 | Reckert et al. | 426/275 |
| 2008/0141868 A1 | * | 6/2008 | Cook et al. | 99/386 |

* cited by examiner

Primary Examiner—Daniel Robinson
(74) Attorney, Agent, or Firm—John R. Hoffman

(57) ABSTRACT

A toaster for bread-type food products includes a housing defining at least one toasting cavity having an upper mouth for depositing the food products into the cavity and a lower opening from which toasted food products exit the cavity. A perforate rack is provided beneath the lower opening and onto which the toasted food products are deposited as they exit the cavity. The rack is perforated to significantly reduce the surface area of the rack which might otherwise stick to the toasted food products. An imperforate plate is juxtaposed behind the perforate rack to prevent crumbs from the toasted food products from falling into the bottom of the toaster. The plate is spaced from the rack a sufficient distance to prevent any portions of the toasted food products from projecting through the perforate rack and touching the plate and sticking thereto. As disclosed herein, the perforate rack is provided as a wire form structure. At least a portion of the rack is angled to form a ramp down which the toasted food products move toward the front of the toaster. Preferably, the imperforate plate comprises a metal sheet.

12 Claims, 6 Drawing Sheets

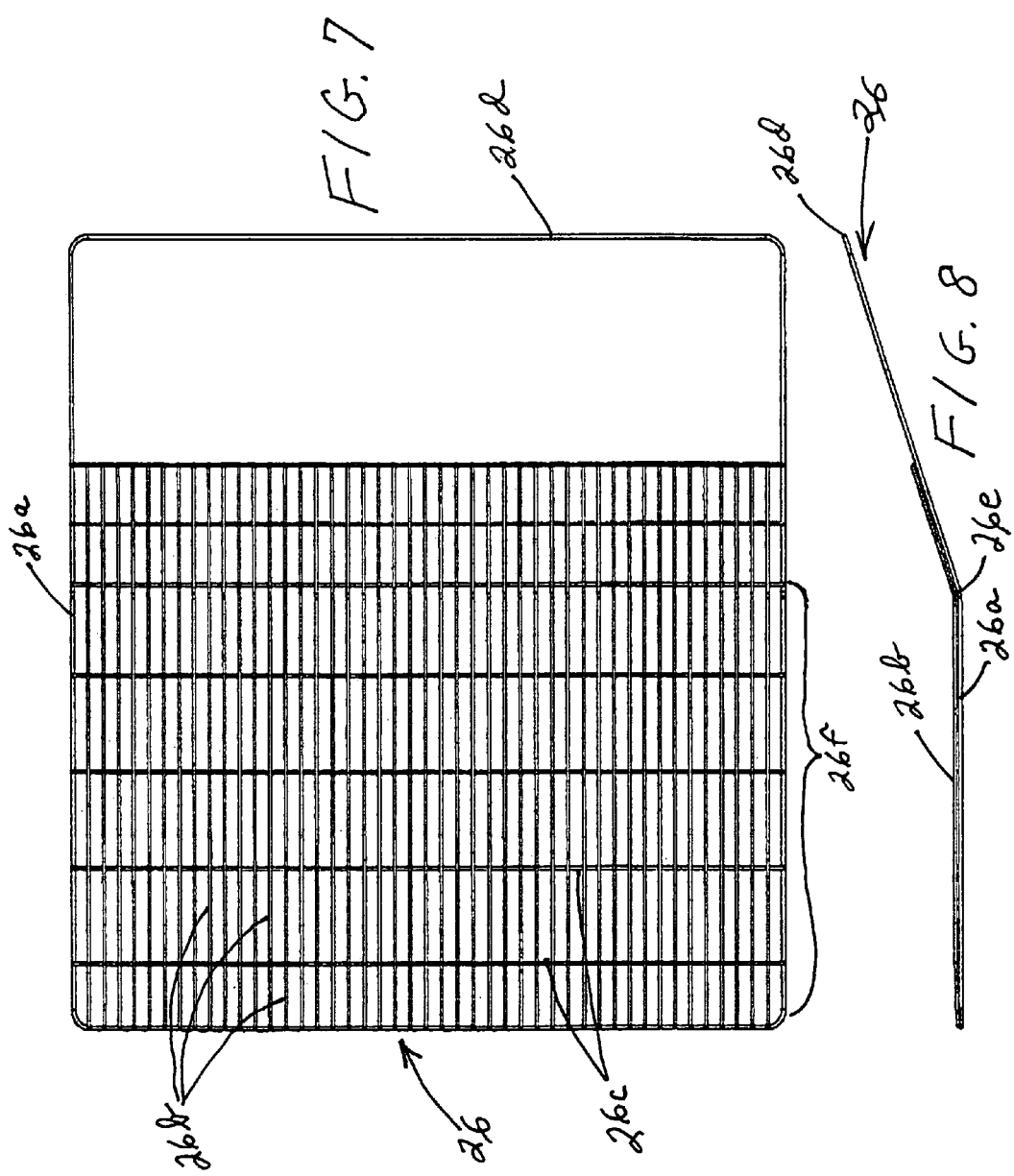

FOOD PRODUCT TOASTER

FIELD OF THE INVENTION

This invention generally relates to the art of toasting apparatus for bread-type food products.

BACKGROUND OF THE INVENTION

Toasting apparatus are used in a wide variety of applications, ranging from simple one or two slice toasters used in the home to more elaborate and large toasting apparatus used in restaurants, such as fast food restaurants, for preparing various bread-type food products. The larger, commercial toasters are used to toast sliced bread, rolls, muffins, biscuits, bagels, buns and similar food products.

In simple toasters used primarily in the home, the toaster most often has a pop-up mechanism whereby the food products are elevated after toasting so that a user can grasp the toasted products. In larger commercial toasters, the toaster typically has an upper mouth for depositing the food products into a toasting cavity, along with a lower opening from which toasted food products exit the cavity onto a ramp or grate. In either apparatus, crumbs from the final toasted products fall to the bottom of the toaster and create cleaning problems.

For instance, in larger commercial toasters, the bottom grate or ramp may be wire-type grate through which the crumbs fall to the bottom of the toaster, causing serious cleaning problems in high volume restaurants, for instance. In order to solve these problems, the bottom ramp has been fabricated as a solid structure, such as a sheet-like ramp of sheet metal material. Unfortunately, the solid or sheet-like ramps create their own problems in that the toasted food products tend to "stick" on the large surface area of the ramp. The present invention is directed to providing a toasting apparatus having a new and improved grate or ramp onto which toasted food products are deposited without sticking and without creating serious cleaning problems.

SUMMARY OF THE INVENTION

An object, therefore, of the invention is to provide a new and improved toasting apparatus of the character described.

In the exemplary embodiment of the invention, a toaster for bread-type food products includes a housing defining at least one toasting cavity having an upper mouth for depositing the food products into the cavity and a lower opening from which toasted food products exit the cavity. A perforate rack is provided beneath the lower opening and onto which the toasted food products are deposited as they exit the cavity. The rack is perforated to significantly reduce the surface area of the rack which might otherwise stick to the toasted food products. An imperforate plate is juxtaposed behind the perforate rack to prevent crumbs from the toasted food products from falling into the bottom of the toaster. The plate is spaced from the rack a sufficient distance to prevent any portions of the toasted food products from projecting through the perforate rack and touching the plate and sticking thereto.

As disclosed herein, the perforate rack is provided as a wire form structure. At least a portion of the rack is angled to form a ramp down which the toasted food products move toward the front of the toaster. Preferably, the imperforate plate comprises a metal sheet.

A tray-like structure is provided beneath the lower opening and into which the perforate rack is properly positioned and from which the rack is easily lifted for cleaning purposes. The imperforate plate forms part of this tray-like structure.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 7 is a top plan view of the rack; and

FIG. 8 is a side elevational view of the rack.

DETAILED DESCRIPTION OF THE PREFERRED EMBODIMENT

Figure 1:
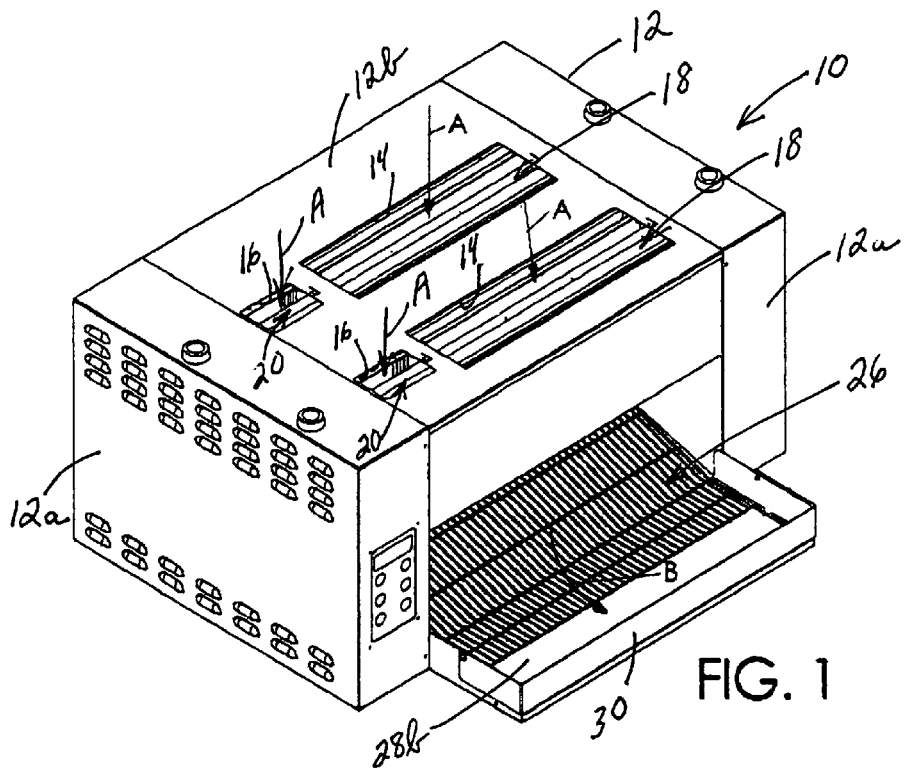
FIG. 1 is a perspective view of a food product toaster incorporating the invention.
Figure 2:
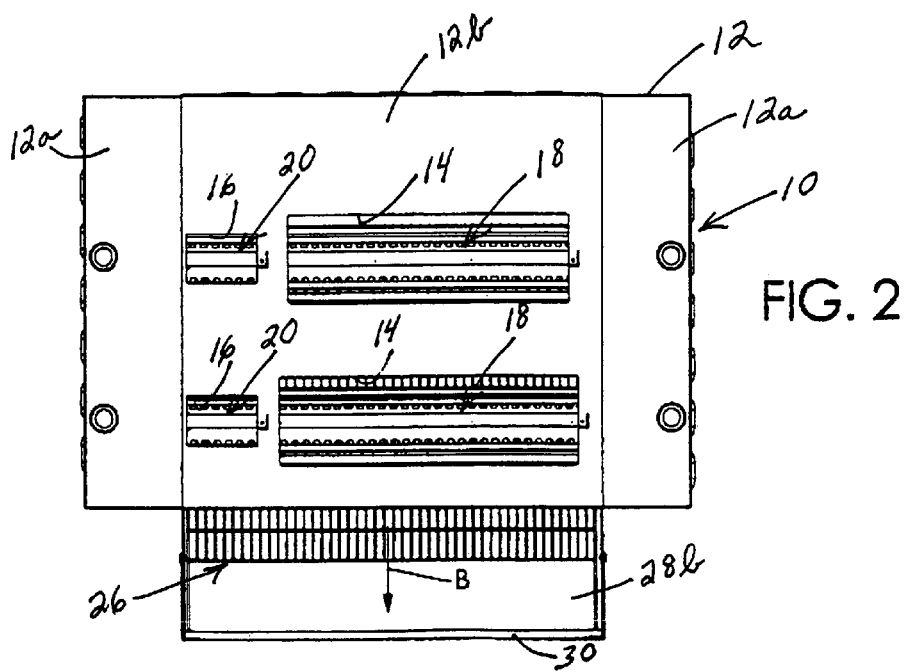
FIG. 2 is a top plan view of the toaster of FIG. 1.

Referring to the drawings in greater detail, and first to FIGS. 1 and 2, the invention is embodied in a toasting apparatus, generally designated 10, for toasting bread-type food products. The toasting apparatus is particularly applicable for use in restaurant establishments, such as fast food restaurants, for toasting such products as bagels, muffins, hamburger buns, slices of bread and the like. This type of toasting apparatus is shown and described in detail in co-pending application Ser. No. 11/134,487 which was filed May 20, 2005 and is assigned to assignee of the present invention. That application now has issued on May 15, 2007, as U.S. Pat. No. 7,217,906. Consequently, the details of the operative components of the toasting apparatus will not be described herein.

With those understandings, suffice it to say that apparatus 10 includes a housing 12 which may be fabricated of formed sheet metal material. The housing includes a pair of vented side walls 12a to gain access to various components of the apparatus. A pair of elongated, generally parallel, larger openings 14, are formed in a top wall 12b of the housing. A pair of smaller openings 16 are formed in the top wall at one end of the larger openings. A pair of heating/toasting cavities, generally designated 18, are provided within the housing immediately beneath openings 14. A pair of heating/toasting cavities, generally designated 20, are provided within the housing immediately beneath openings 16. Openings 14 and 16 define upper mouths through which bread-type food products are deposited into the toasting cavities. After the products are heated or toasted, the products drop into a service tray 20 in the direction of arrows "B" for removal by an attendant. The invention is directed to a rack and plate structure onto which the toasted food products are deposited.

Figure 3:
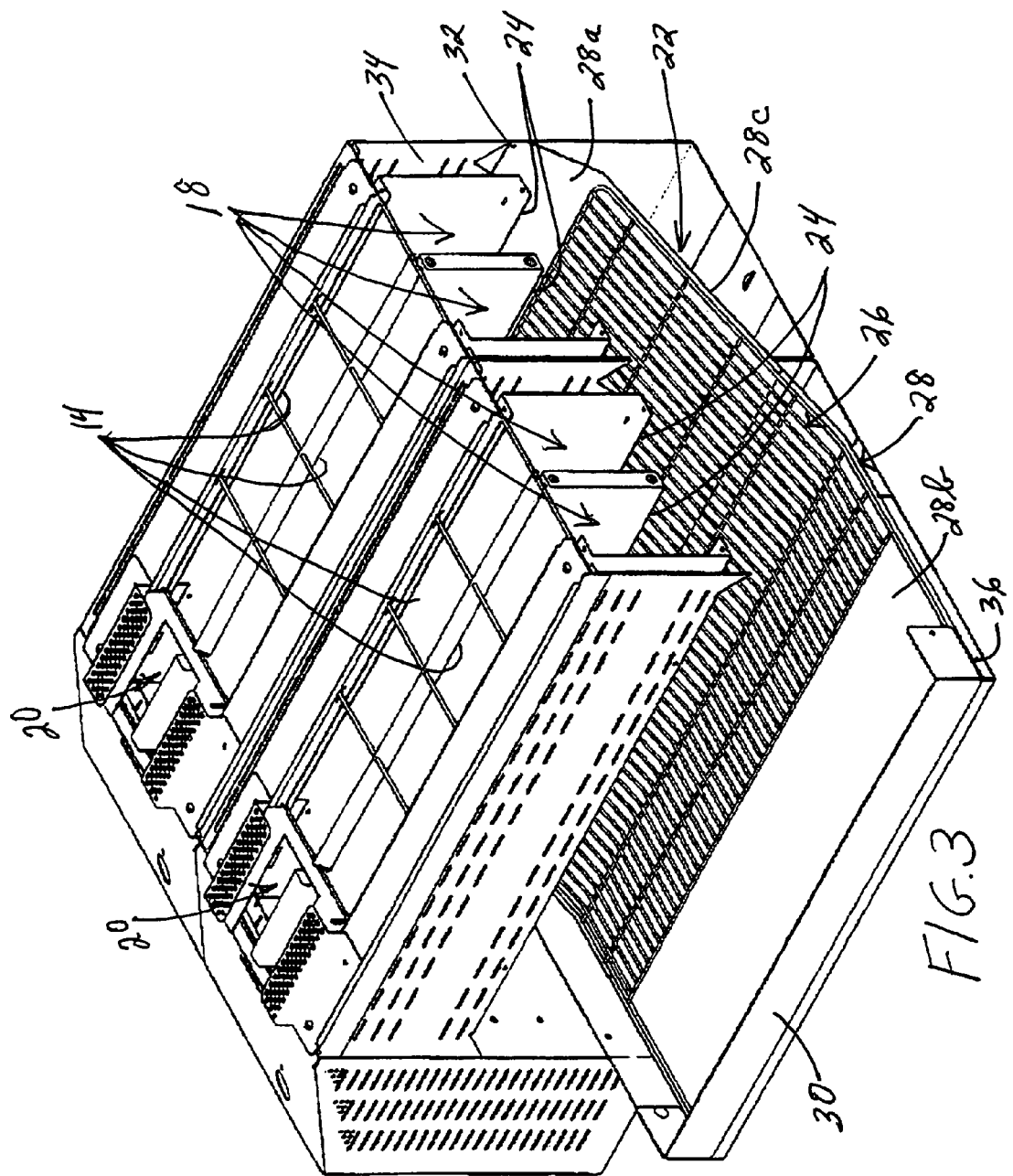
FIG. 3 is another perspective view of the toaster, with much of the shell and operative components removed to facilitate a showing of the interior location of the perforate rack and imperforate plate combination of the invention.
Figure 4:
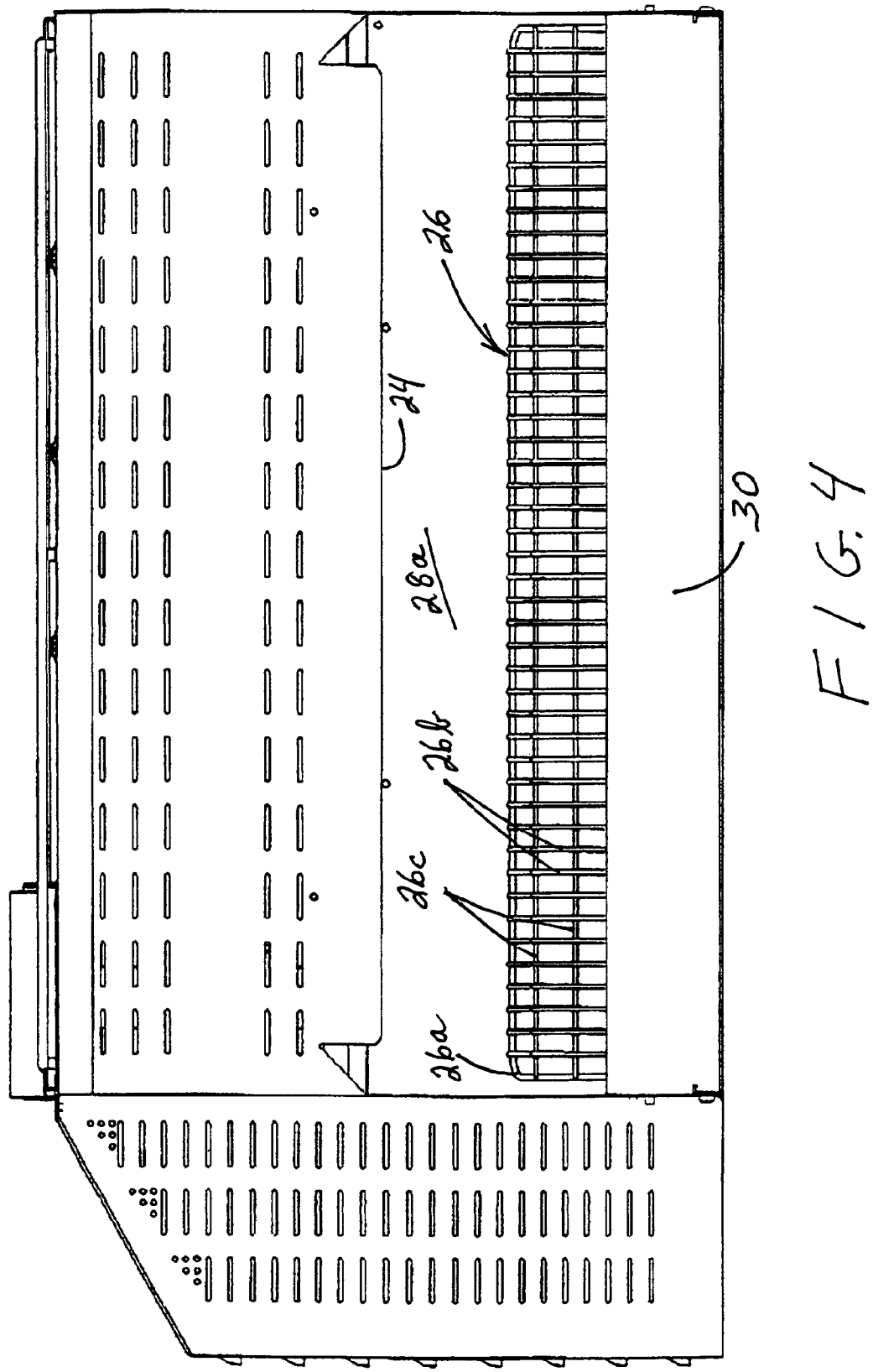
FIG. 4 is an enlarged front elevational view of the structure in FIG. 3.
Figure 5:
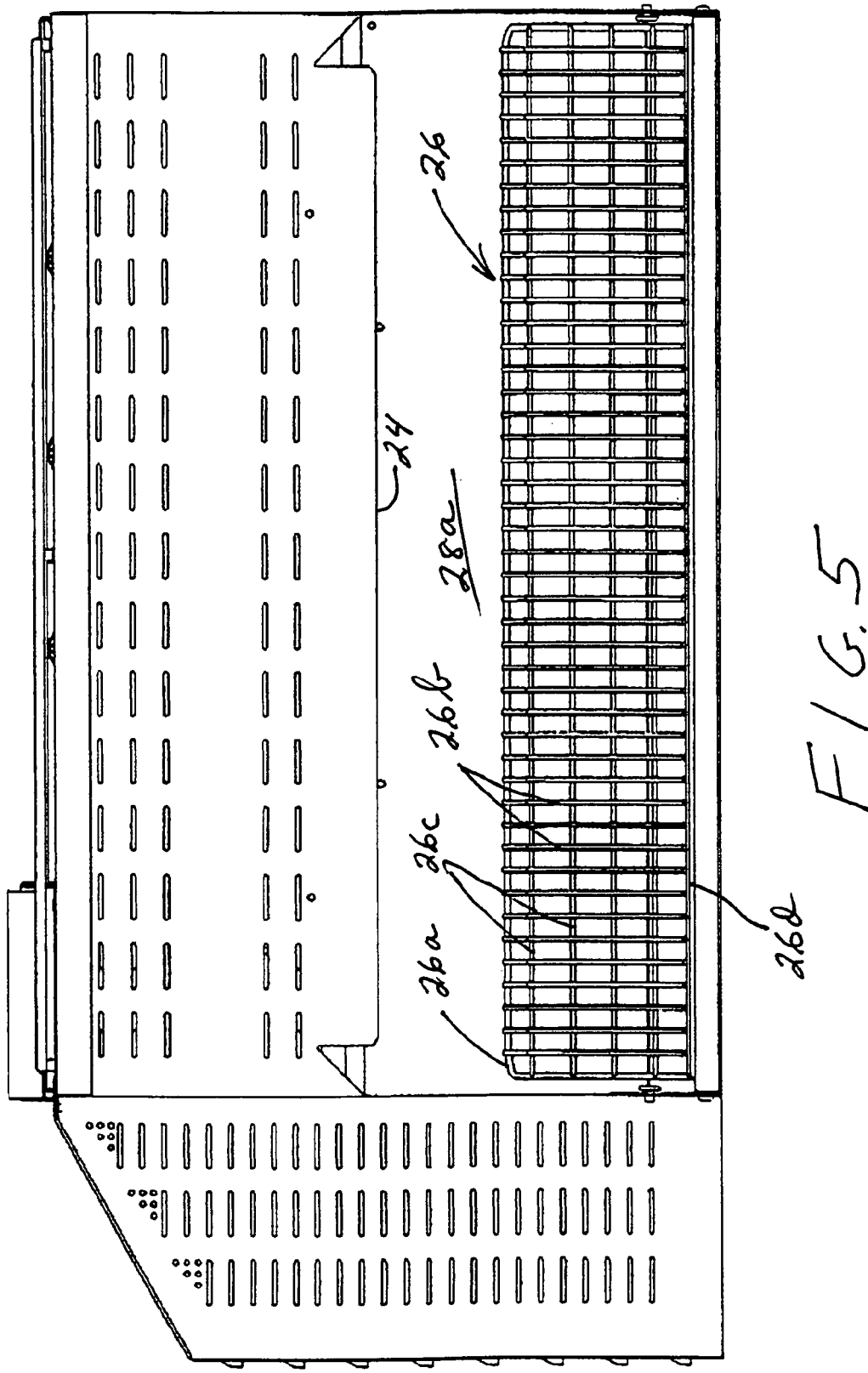
FIG. 5 is a view similar to that of FIG. 4, with the front stop plate removed.

Specifically, referring to FIGS. 3-5, the invention is directed to a rack and plate combination, generally designated 22, which is located beneath a plurality of lower openings 24 from which the toasted food products exit from toasting cavities 18 and 20. Generally, the invention contemplates a perforate rack, generally designated 26, positioned on top of an imperforate plate, generally designated 28.

Figure 6:
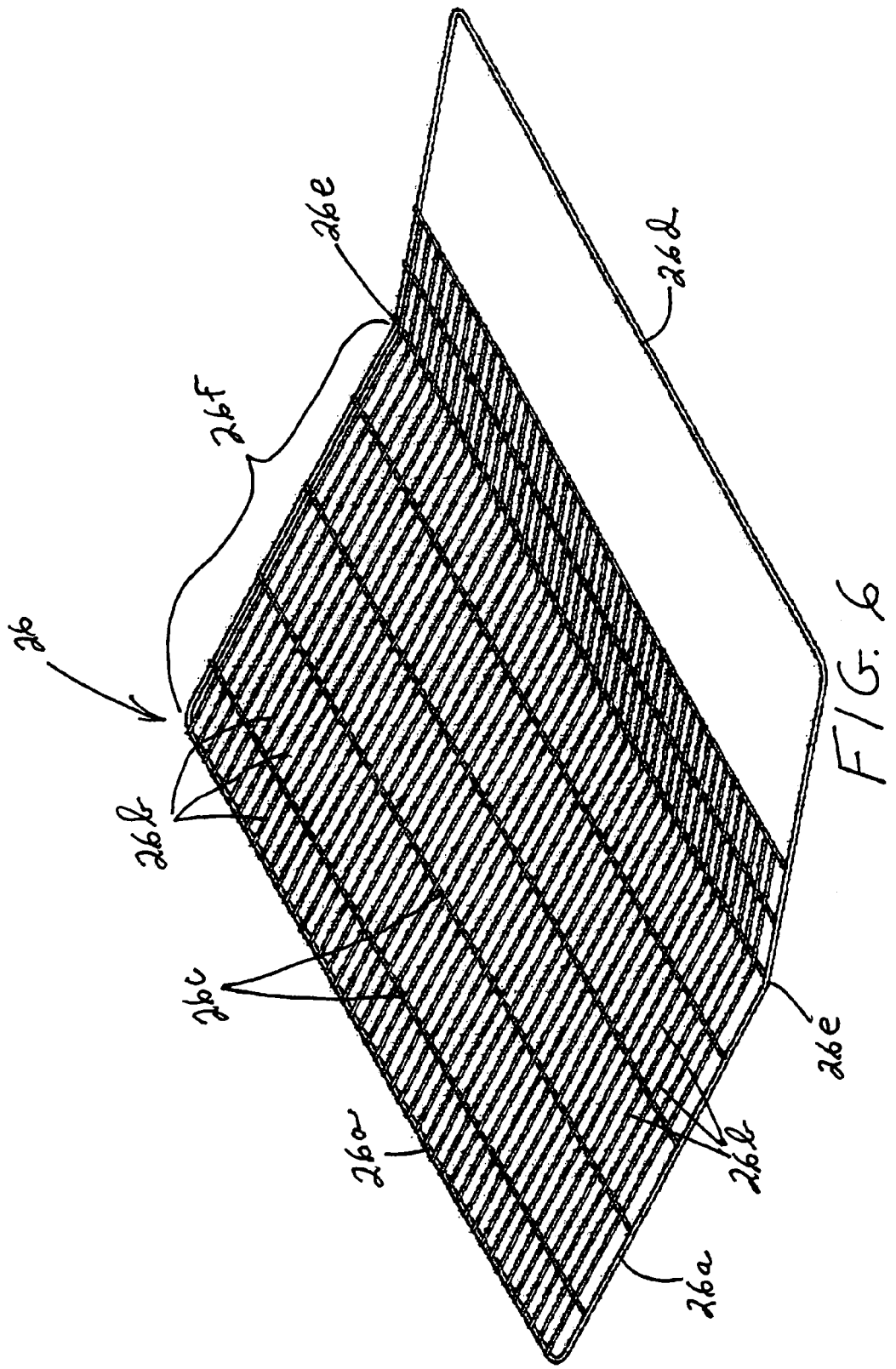
FIG. 6 is a perspective view of the perforate rack.

Referring to FIGS. 6-8 in conjunction with FIGS. 3-5, the perforate rack 26 preferably is efficiently fabricated as a wire-form structure which has a generally rectangular wire frame 26a, with a plurality of parallel wires 26b and cross wires 26c fixed thereto. The parallel wires and cross wires stop short of the front end of the rack to define a U-shaped lip portion 26d of wire frame 26a. The wire frame is bent, as at 26e, to form a ramp 26f which is angled and down which the toasted food products move toward the front of the toaster. As seen best in FIG. 3, a front stop plate 30 forms a wall against which the toasted food products can abut as they move down the ramp formed by rack 26.

Referring back to FIGS. 3-5, imperforate plate 28 is secured at a location 32 (FIG. 3) to a rear wall 34 of the toaster frame. The plate may be fabricated of sheet metal material and is formed to include a rear lip 28a, a front lip 28b and an angled ramp 28c. The front lip is secured, as at a location 36, to a front projecting portion of the toaster frame. The front stop plate 30 is generally U-shaped as seen clearly in FIG. 3 and is also fixed at the front of the toaster frame. Therefore, the toasted food products move down the ramp portion 26f of rack 26, off of the wires of the rack, and onto the front lip 28b of plate 28 in the direction of arrow "C" (FIG. 3), and the toasted food products can move forwardly against front stop plate 30.

Although other perforated racks are contemplated by the invention, the wire form (perforated) rack 26 is a preferred embodiment of the invention. In any event, the rack should be sufficiently perforated or "porous" to significantly reduce the surface area of the rack which otherwise might stick to the toasted food products. This enables the food products to move freely down the angled rack to the front of the toaster. The solid or sheet-like plate 28 is juxtaposed behind the perforate rack to prevent crumbs from the toasted food products from falling into the bottom of the toaster where cleaning would be quite difficult.

In addition, the plate is spaced from the top plane of the rack a sufficient distance to prevent any portions of the toasted food products from projecting through the perforate rack and touching the plate and sticking thereto. To that end, parallel wires 26b (FIG. 6) are fixed to the top of wire frame 26a and cross wires 26c to provide sufficient spacing between the top surface or plane of the wire rack and the top surface of imperforate plate 28.

Generally, a tray-like structure is provided beneath lower openings 24 and into which the perforate rack 26 is properly positioned and from which the rack is easily lifted for cleaning purposes. In the exemplary embodiment of the invention, this tray-like structure is efficiently provided by plate 28 and front stop plate 30. This can be seen clearly in FIG. 3. The wire rack 26 simply is positioned into and removed from this tray-like structure, whereby crumbs on top of plate 26, particularly at the front thereof behind the front stop plate 30, can be very easily removed. The wire rack is freely positioned and removed from within the toaster without the use of any fastening means whatsoever. Cleaning of the crumbs could not be any simpler.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

The invention claimed is:

1. A toaster for bread-type food products, comprising:
    a housing defining at least one toasting cavity having an upper mouth for depositing the food products into the cavity and a lower opening from which toasted food products exit the cavity;
    a perforate rack beneath the lower opening and onto which the toasted food products are deposited as they exit the cavity, the rack extending in a path from beneath said lower opening to the front of the toaster, and the rack being perforated to significantly reduce the surface area of the rack which might otherwise stick to the toasted food products; and
    an imperforate plate juxtaposed behind the perforate rack to prevent crumbs from the toasted food products from falling into the bottom of the toaster, the plate being spaced from the rack a sufficient distance to prevent any portions of the toasted food products from projecting through the perforate rack touching the plate and sticking thereto, and the plate being spaced from the rack along substantially the entire length of said path from beneath said lower opening to the front of the toaster.

2. The toaster of claim 1 wherein said perforate rack comprises a wire form structure.

3. The toaster of claim 1 wherein at least a portion of said rack is angled to form a ramp down which the toasted food products move toward the front of the toaster.

4. The toaster of claim 1, including a tray-like structure beneath said lower opening and into which the perforate rack is properly positioned and from which the rack is easily lifted for cleaning purposes.

5. The toaster of claim 4 wherein said imperforate plate forms part of said tray-like structure.

6. The toaster of claim 1 wherein said imperforate plate comprises a metal sheet.

7. A toaster for bread-type food products, comprising:
    a housing defining at least one toasting cavity having an upper mouth for depositing the food products into the cavity and a lower opening from which toasted food products exit the cavity;
    a wire form perforate rack beneath the lower opening and onto which the toasted food products are deposited as they exit the cavity, the wire form rack significantly reducing the surface area of the rack which might otherwise stick to the toasted food products, at least a portion of the rack being angled to form a ramp down which the toasted food products move in a path from said lower opening toward the front of the toaster; and
    an imperforate plate juxtaposed behind the perforate rack to prevent crumbs from the toasted food products from falling into the bottom of the toaster, the plate being spaced from the rack a sufficient distance to prevent any portions of the toasted food products from projecting through the perforate rack touching the plate and sticking thereto, and the plate being spaced from the rack along substantially the entire length of said path from beneath said lower opening to the front of the toaster.

8. The toaster of claim 7, including a tray-like structure beneath said lower opening and into which the perforate rack is properly positioned and from which the rack is easily lifted for cleaning purposes.

9. The toaster of claim 8 wherein said imperforate plate forms part of said tray-like structure.

10. The toaster of claim 7 wherein said imperforate plate comprises a metal sheet.

11. A toaster for bread-type food products, comprising:
a housing defining at least one toasting cavity having an upper mouth for depositing the food products into the cavity and a lower opening from which toasted food products exit the cavity;
a wire form perforate rack beneath the lower opening and onto which the toasted food products are deposited as they exit the cavity, the wire form rack significantly reducing the surface area of the rack which might otherwise stick to the toasted food products, at least a portion of the rack being angled to form a ramp down which the toasted food products move in a path from said lower opening toward the front of the toaster;
an imperforate plate of sheet metal material juxtaposed behind the perforate rack to prevent crumbs from the toasted food products from falling into the bottom of the toaster, the plate being spaced from the rack a sufficient distance to prevent any portions of the toasted food products from projecting through the perforate rack touching the plate and sticking thereto, and the plate being spaced from the rack along substantially the entire length of said path from beneath said lower opening to the front of the toaster; and
a tray-like structure beneath said lower opening and into which the perforate rack is properly positioned and from which the rack is easily lifted for cleaning purposes.

12. The toaster of claim 11 wherein said imperforate plate forms part of said tray-like structure.

* * * * *